(12) United States Patent
Ahmed et al.

(10) Patent No.: US 9,886,332 B2
(45) Date of Patent: Feb. 6, 2018

(54) STORAGE AND APPLICATION INTERCOMMUNICATION USING ACPI

(71) Applicant: International Business Machines Corporation, Armonk, NY (US)

(72) Inventors: Faisal Ahmed, Round Rock, TX (US); Brian C. Twichell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 14/702,992

(22) Filed: May 4, 2015

(65) Prior Publication Data

US 2016/0328277 A1     Nov. 10, 2016

(51) Int. Cl.
*G06F 9/54* (2006.01)
*G06F 9/52* (2006.01)
*G06F 9/48* (2006.01)

(52) U.S. Cl.
CPC ............ *G06F 9/542* (2013.01); *G06F 9/4812* (2013.01); *G06F 9/52* (2013.01); *G06F 9/546* (2013.01)

(58) Field of Classification Search
None
See application file for complete search history.

(56) References Cited

U.S. PATENT DOCUMENTS

| | | | |
|---|---|---|---|
| 7,313,684 B2 | 12/2007 | O'Connell | |
| 2003/0065853 A1* | 4/2003 | Lary | .......... G06F 9/4812 710/260 |
| 2004/0243534 A1* | 12/2004 | Culter | .......... G06F 9/4411 |
| 2010/0153765 A1* | 6/2010 | Stemen | .......... G06F 1/3203 713/340 |
| 2010/0262722 A1* | 10/2010 | Vauthier | .......... G06F 3/14 710/8 |
| 2014/0006728 A1 | 1/2014 | Koide et al. | |
| 2014/0181811 A1* | 6/2014 | Tsirkin | .......... G06F 9/45558 718/1 |
| 2014/0297999 A1 | 10/2014 | Kim et al. | |

(Continued)

FOREIGN PATENT DOCUMENTS

| | | |
|---|---|---|
| CN | 102439565 B | 4/2013 |
| EP | 2607987 A1 | 6/2013 |
| KR | 1020050071229 A | 7/2005 |

OTHER PUBLICATIONS

Brown et al., "Toward Energy-Efficient Computing", Communications of the ACM, Mar. 2010, vol. 53, No. 3, 2010 ACM 0001-0782/10/0300, pp. 50-58.

(Continued)

*Primary Examiner* — Timothy A Mudrick
*Assistant Examiner* — Abdou Seye
(74) *Attorney, Agent, or Firm* — L. Jeffrey Kelly

(57) ABSTRACT

Storage system and application intercommunication is provided. A first kernel-mode module determines a first event corresponding to an operational parameter of a first node based, at least in part, on a shared namespace accessible by the first kernel-mode module and a second kernel-mode module. An interrupt is issued based on the first event from the first kernel-mode module to the second kernel-mode module via an interface. The second kernel-mode module issues a second event to a second node, wherein the second event corresponds to the object of the shared namespace.

17 Claims, 6 Drawing Sheets

(56) References Cited

U.S. PATENT DOCUMENTS

2015/0019855 A1* 1/2015 Chen ............... G06F 9/4411
                                                   713/2
2015/0100801 A1* 4/2015 Maity ............... G06F 1/3206
                                                   713/320

OTHER PUBLICATIONS

Namboodiri et al., "To Cloud or Not to Cloud: A Mobile Device Perspective on Energy Consumption of Applications", Department of Electrical Engineering and Computer Science Wichita State University, 2012 IEEE International Symposium on a World of Wireless, Mobile and Multimedia Networks, pp. 1-9.

* cited by examiner

STORAGE AND APPLICATION INTERCOMMUNICATION USING ACPI

TECHNICAL FIELD

The present invention relates generally to the field of advanced configuration and power interface (ACPI) management and, more particularly, to storage and application intercommunication using ACPI.

BACKGROUND OF THE INVENTION

A basic input/output system (BIOS) is currently used as boot firmware of a computer system. However, since the BIOS cannot support 64 bit personal computers or ARM based devices, an extensible firmware interface (EFI) has been developed to overcome the shortcomings of the BIOS. The EFI is implemented as an open source to become a unified extensible firmware interface (UEFI) and may be used to replace the BIOS.

The Advanced Configuration and Power Interface (ACPI) specification provides an open standard for device configuration and power management by the operating system (OS). ACPI defines platform-independent interfaces for hardware discovery, configuration, power management and monitoring. With the intention of replacing Advanced Power Management, the MultiProcessor Specification and the Plug and Play BIOS Specification, the ACPI standard brings power management under the control of the OS, as opposed to the previous BIOS-central system which relied on platform-specific firmware to determine power management and configuration policy.

SUMMARY

According to one embodiment of the present invention, a method for storage and application intercommunication using ACPI is provided. The method includes: determining, by a first kernel-mode module, a first event corresponding to an operational parameter of a first node based, at least in part, on a shared namespace accessible by the first kernel-mode module and a second kernel-mode module; issuing an interrupt based on the first event from the first kernel-mode module to the second kernel-mode module via an interface; and issuing, by the second kernel-mode module, a second event to a second node, wherein the second event corresponds to the object of the shared namespace.

According to another embodiment of the present invention, a computer program product for storage and application intercommunication using ACPI is provided. The computer program product comprises a computer readable storage medium and program instructions stored on the computer readable storage medium. The program instructions include: program instructions to determine, by a first kernel-mode module, a first event corresponding to an operational parameter of a first node based, at least in part, on a shared namespace accessible by the first kernel-mode module and a second kernel-mode module; program instructions to issue an interrupt based on the first event from the first kernel-mode module to the second kernel-mode module via an interface; and program instructions to issue, by the second kernel-mode module, a second event to a second node, wherein the second event corresponds to the object of the shared namespace.

According to another embodiment of the present invention, a computer system for storage and application intercommunication using ACPI is provided. The computer system includes one or more computer processors, one or more computer readable storage media, and program instructions stored on the one or more computer readable storage media for execution by at least one of the one or more processors. The program instructions include: program instructions to determine, by a first kernel-mode module, a first event corresponding to an operational parameter of a first node based, at least in part, on a shared namespace accessible by the first kernel-mode module and a second kernel-mode module; program instructions to issue an interrupt based on the first event from the first kernel-mode module to the second kernel-mode module via an interface; and program instructions to issue, by the second kernel-mode module, a second event to a second node, wherein the second event corresponds to the object of the shared namespace.

DETAILED DESCRIPTION

Embodiments of the present invention recognize that modern high-performance storage devices can support input/output operations per second substantially higher than the traditional arrays of spinning disk drives. The increased performance of this hardware can significantly improve application response time by providing faster access to the data stored on the storage devices. Embodiments further recognize that the storage devices and applications lack a signaling capability that could extract even better performance and higher efficiency.

Embodiments of the present invention provide an event-driven intercommunication mechanism that enables both applications and high-performance storage devices to mutually benefit from awareness of each other's runtime states. Further provided is an in-memory based synching mechanism between a high-performance storage (e.g., flash storage) subsystem and user-level applications (e.g., database programs). This mechanism can utilize ACPI, for example the ACPI BIOS interface of the Intel processor architecture.

According to embodiments of the present invention, the firmware of the storage subsystem and a kernel-mode module of the application share an ACPI namespace for signaling events to each other.

Figure 1:
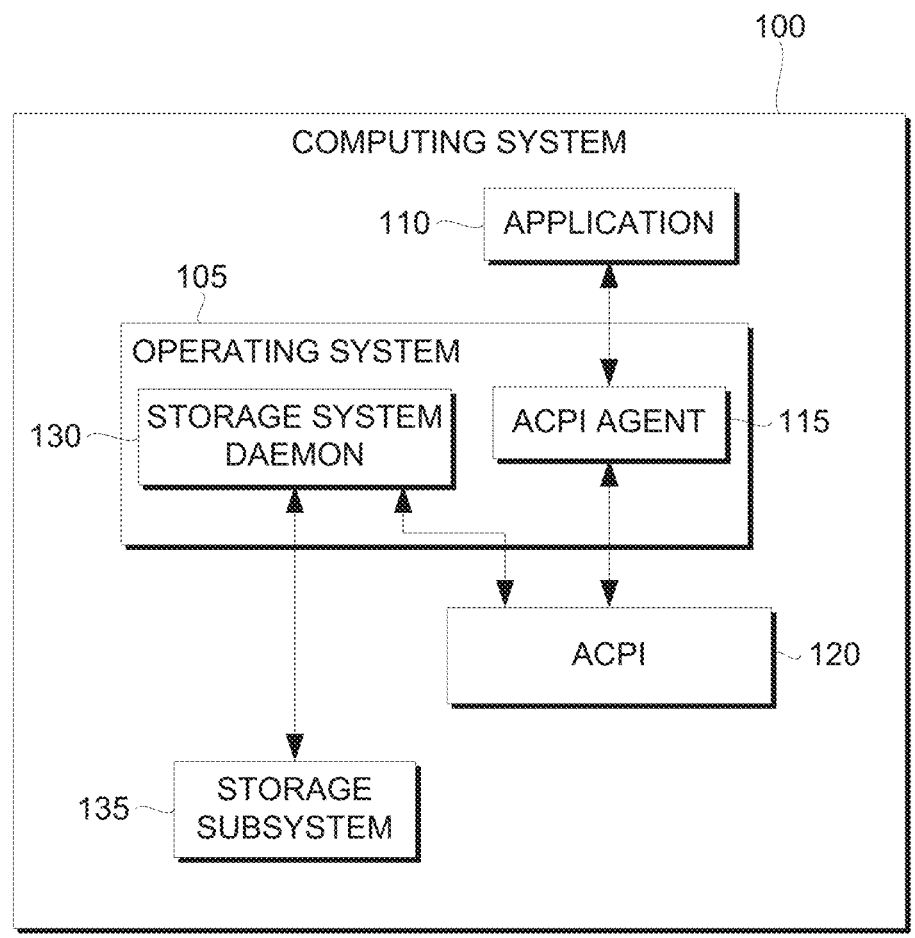
FIG. 1 is a functional block diagram illustrating a computing system, in accordance with embodiments of the present invention.

Embodiments of the present invention will now be described in detail with reference to the Figures. FIG. 1 is a functional block diagram illustrating a computing environment, in accordance with embodiments of the present invention. The computing environment includes computing system 100, on which embodiments of the present invention may be implemented. As depicted, computing system 100 include OS 105, application 110, ACPI agent 115, ACPI subsystem 120, storage system daemon 130, and storage subsystem 135.

In various embodiments, computing system 100 is a computing device that can be a standalone device, a server, a laptop computer, a tablet computer, a netbook computer, a personal computer (PC), or a desktop computer. In another embodiment, computing system 100 represents a computing system utilizing clustered computers and components to act as a single pool of seamless resources. In general, computing system 100 can be any computing device or a combination of devices with access to and/or capable of executing ACPI subsystem 120. Computing system 100 may include internal and external hardware components, as depicted and described in further detail with respect to FIG. 7.

In the embodiment depicted in FIG. 1, application 110, ACPI agent 115, ACPI subsystem 120, storage system daemon 130, and storage subsystem 135 reside in or on computing system 100. In other embodiments, one or more of application 110, ACPI agent 115, ACPI subsystem 120, storage system daemon 130, and storage subsystem 135 may reside in or on another computing device, provided that each can access and is accessible by each other in the manner represented by arrows in FIG. 1. In yet other embodiments, one or both of application 110, ACPI agent 115, ACPI subsystem 120, storage system daemon 130, and storage subsystem 135 may be stored externally and accessed through a communication network (not shown). Such a network can be, for example, a local area network (LAN), a wide area network (WAN) such as the Internet, or a combination of the two, and may include wired, wireless, fiber optic or any other connection known in the art. In general, the network can be any combination of connections and protocols that will support communications between computing system 100 and another computing device or computing system, in accordance with embodiments of the present invention.

OS 105 is an operating system executed by computing system 100. In one embodiment, OS 105 includes support for OS-directed configuration and power management (OSPM). In another embodiment, OS 105 includes a legacy operating system, meaning that it is an operating system in which power management policy decisions are made by the platform hardware/firmware of the system.

Application 110 represents a user-level program executed by computing system 100. Application 110 generates application events and consumes storage events. For example, application 110 communicates a generated application event to storage subsystem 135. In another example, application 110 consumes a storage event communicated from storage subsystem 135. Application 110 communicates events with storage subsystem 135 by way of ACPI agent 115, ACPI subsystem 120, and storage system daemon 130. In some embodiments, application 110 includes a correlation table that correlates storage events with actions to be performed by application 110. For example, application 110 receives a storage event from storage subsystem 135 and, in response, performs an action correlated with the storage event. In one embodiment, an event corresponds to an operational parameter. In various examples, an operational parameter is a current status of application 110, an anticipated status of application 110, a current status of storage subsystem 135, or an anticipated status of storage subsystem 135. An anticipated status may be based on activity that has not yet occurred, such as, for example, one or more operations that are scheduled but have not yet been performed. In one example, a storage event corresponds to a current status of storage subsystem 135 indicating that a read buffer is full. In another example, an application event corresponds to an anticipated status of application 110 indicating that application 110 anticipates performing a large number of non-consecutive read operations.

ACPI agent 115 is a kernel-mode module. ACPI agent 115 communicates with ACPI subsystem 120 via interrupts. An interrupt may be, for example, a system management interrupt (SMI) or a system control interrupt (SCI). ACPI agent 115 communicates with application 110 via a message passing protocol or other inter-application communication technique. In one embodiment, ACPI agent 115 is a software module executed by computing system 100. For example, ACPI agent 115 may operate via OS 105. An SCI is a system interrupt used to notify OS 105 of ACPI events. The SCI is an active, low, shareable, level interrupt. An SMI is an OS-transparent interrupt generated by interrupt events on legacy systems. By contrast, on ACPI systems, interrupt events generate an OS-visible interrupt that is shareable.

ACPI subsystem 120 is an interface that complies with the ACPI standard, as promulgated by the UEFI Forum. In one embodiment, ACPI subsystem 120 is an interface provided via a BIOS. In another embodiment, ACPI subsystem 120 is an interface provided via UEFI, which is an interface between the OS and the platform firmware. UEFI is provided in the form of data tables that contain platform related information, and boot and run-time service calls that are available to the OS and loader. Together, these provide a standard environment for booting an OS (e.g., OS 105). The architecture of ACPI subsystem 120 is discussed further in connection with FIGS. 2-4. Although ACPI is discussed for descriptive convenience herein, one of ordinary skill in the art should appreciate that aspects of the present invention may be implemented utilizing any suitable syncing mechanism for storage subsystems and user-level applications. A suitable synching mechanism is one that is memory-resident, interrupt-driven, and event-based. Such suitable synching mechanisms include, for example, ACPI and system management basic input output system (SMBIOS).

Storage system daemon 130 is a kernel-mode module. Storage system daemon 130 communicates with ACPI subsystem 120 via interrupts (e.g., SMI or SCI). Storage system daemon 130 communicates with firmware of storage subsystem 135 via a storage interface. In various embodiments, the storage interface is a Small Computer System Interface (SCSI) or Serial ATA (SATA).

Storage subsystem 135 includes a storage device. Storage subsystem 135 communicates with storage system daemon 130 via the storage interface (e.g., via SCSI). In one embodiment, storage subsystem 135 includes a high-performance storage device such as a flash storage device. In other embodiments, storage subsystem 135 includes one or more of: a magnetic hard disk drive, a solid state hard drive, a semiconductor storage device, read-only memory (ROM), erasable programmable read-only memory (EPROM), flash memory, or any other computer readable storage media that is capable of storing digital information and communicating with storage system daemon 130 via the storage interface. In some embodiments, storage subsystem 135 includes a correlation table that correlates application events with actions to be performed by storage subsystem 135. For example, storage subsystem 135 receives an application event from application 110 and, in response, performs an action correlated with the application event.

Figure 2:
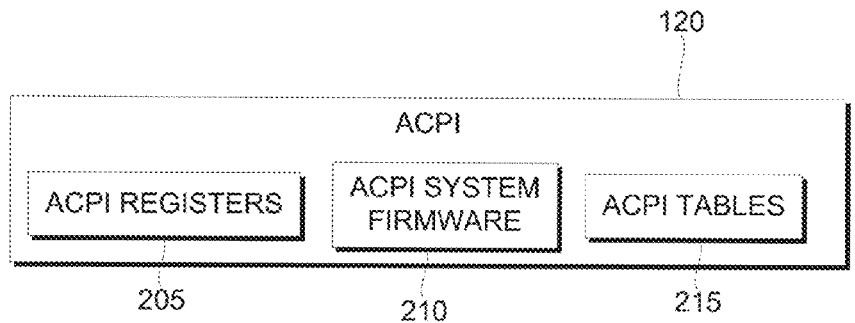
FIG. 2 is a flowchart depicting operations for storage and application intercommunication using ACPI, on the computing system of FIG. 1, in accordance with embodiments of the present invention.

FIG. 2 is a diagram depicting the ACPI subsystem of FIG. 1, in accordance with embodiments of the present invention. ACPI subsystem 120 includes ACPI registers 205, ACPI system firmware 210, and ACPI tables 215.

ACPI registers 205 is the constrained part of the hardware interface, described (at least in location) by the ACPI System Description Tables.

ACPI system firmware 210 refers to the portion of the firmware that is compatible with the ACPI specifications. Typically, ACPI system firmware 210 includes the code that boots the machine, such as an OS loader (e.g., a legacy BIOS, a UEFI OS loader). ACPI system firmware 210 may also implement interfaces for sleep, wake, and some restart operations. ACPI system firmware 210 may also provide the ACPI Description Tables.

ACPI tables 215 describe the interfaces to the hardware of computing system 100. Some descriptions may limit what can be built (for example, some controls are embedded in fixed blocks of registers and the table specifies the address of the register block). Other descriptions may allow the hardware to be built in arbitrary ways and can describe arbitrary operation sequences needed to make the hardware function. ACPI Tables containing "definition blocks" can make use of a pseudo-code type of language, the interpretation of which is performed by OS 105. That is, OSPM contains and uses an interpreter that executes procedures encoded in the pseudo-code language and stored in the ACPI tables containing definition blocks. The pseudo-code language, known as ACPI Machine Language (AML), is a compact, tokenized, abstract type of machine language supported by an ACPI-compatible OS and in which ACPI control methods and objects are written. ACPI Source Language (ASL) is the programming language equivalent for AML. ASL is compiled into AML images.

Figure 3:
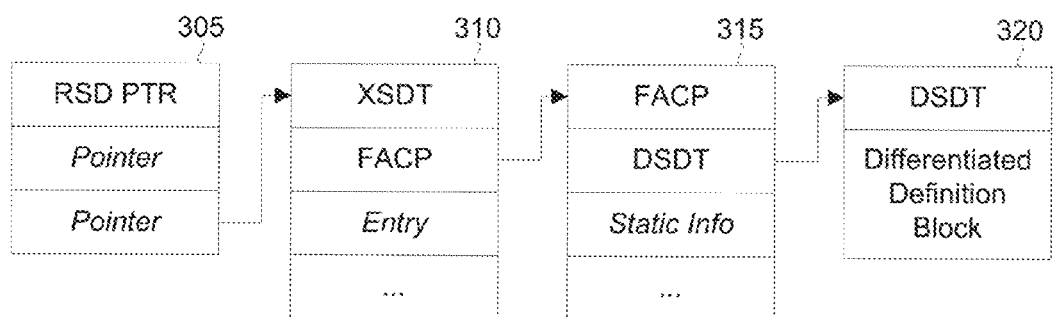
FIG. 3 is a flowchart depicting operations for storage and application intercommunication using ACPI, on the computing system of FIG. 1, in accordance with embodiments of the present invention.

FIG. 3 is a diagram depicting an architecture of system description tables, according to embodiments of the present invention. For example, FIG. 3 depicts the architecture of ACPI tables 215.

A Root System Description Pointer (RSDP) structure, designated RSDP structure 305, is located in the memory address space of computing system 100 and is setup by ACPI system firmware 210. In one embodiment, RSDP structure 305, once loaded, resides in the low address space of the memory of computing system 100. In one embodiment, the RSDT is a table with the signature "RSDT" having an array of physical pointers to other system description tables. RSDP structure 305 provides the physical address of one or both of the Root System Description Table (RSDT) (not shown) and Extended System Description Table (XSDT). In one example, OS 105 locates the RSDT by following the pointer in RSDP structure 305 that points to the RSDT.

XSDT 310 provides identical functionality to RSDP structure 305 but accommodates physical addresses of pointers that are larger than 32 bits. In one embodiment, XSDT 310 references other description tables that provide OSPM data, such as information describing the implementation and configuration of computing system 100. XSDT 310 includes a pointer that points to a Fixed ACPI Description table (FADT), designated FADT 315. In the depicted embodiment, the value "FACP" is the signature for FADT 315. However, it should understood that embodiments of the present invention are not limited to particular naming schemes.

FADT 315 includes various fixed-length entries that describe the fixed ACPI features of the hardware of computing system 100. In one embodiment, FADT 315 includes a pointer that points to a Differentiated System Description Table (DSDT), designated DSDT 320. In some embodiments, FADT 315 includes the ACPI Hardware Register Block implementation and configuration details that OS 105 needs to directly manage the ACPI Hardware Register Blocks.

DSDT 320 includes information and descriptions for various system features (e.g., platform implementation and configuration details). In one embodiment, DSDT 320 contains the Differentiated Definition Block, which supplies the implementation and configuration information about the base system. OS 105 may insert the namespace information defined in the Differentiated Definition Block of DSDT 320 into the ACPI Namespace (see FIG. 4 and accompanying discussion) at system boot time.

Figure 4:
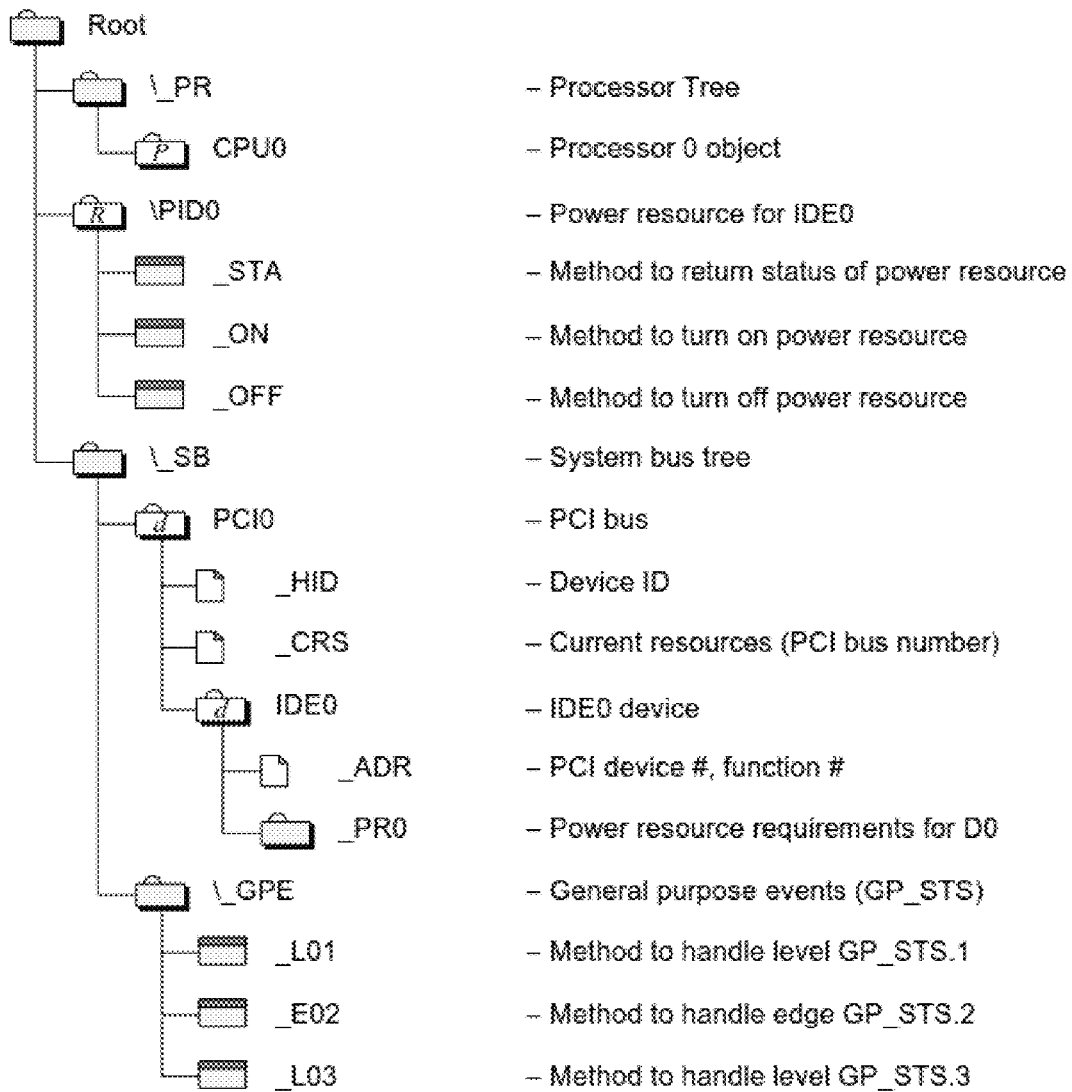
FIG. 4 is an example of an ACPI namespace, in accordance with embodiments of the present invention.

FIG. 4 is an example of an ACPI namespace, in accordance with embodiments of the present invention.

An ACPI namespace is a hierarchical tree structure in OS-controlled memory that contains named objects. The nodes of the ACPI Namespace are objects that may be inserted in the tree by OS 105 using the information in the system definition tables. These objects can be data objects, package objects, control method objects, and so on. For example, package objects refer to other objects. Objects may also have a type, size, and relative name.

OS 105 may dynamically change the contents of the namespace at run-time by loading and/or unloading definition blocks from ACPI Tables 215. Information in the ACPI namespace comes from DSDT 320, which contains the Differentiated Definition Block, and may also contain one or more other definition blocks.

In one embodiment, ACPI agent 115 and storage system daemon 130 each have access to a shared namespace. The shared namespace includes an object for each of one or more operational parameters of application 110 and storage subsystem 135. ACPI agent 115 and storage system daemon 130 can utilize the shared namespace to signal events to one another. In one example, the shared namespace includes a '_read.full' event that corresponds to an operational parameter of storage subsystem 135 indicating that a read buffer of storage subsystem 135 is full. In another example, the shared namespace includes a '_incoming.write' event that corresponds to an operational parameter of application 110 indicating that application 110 anticipates performing one or more write operations.

Figure 5:
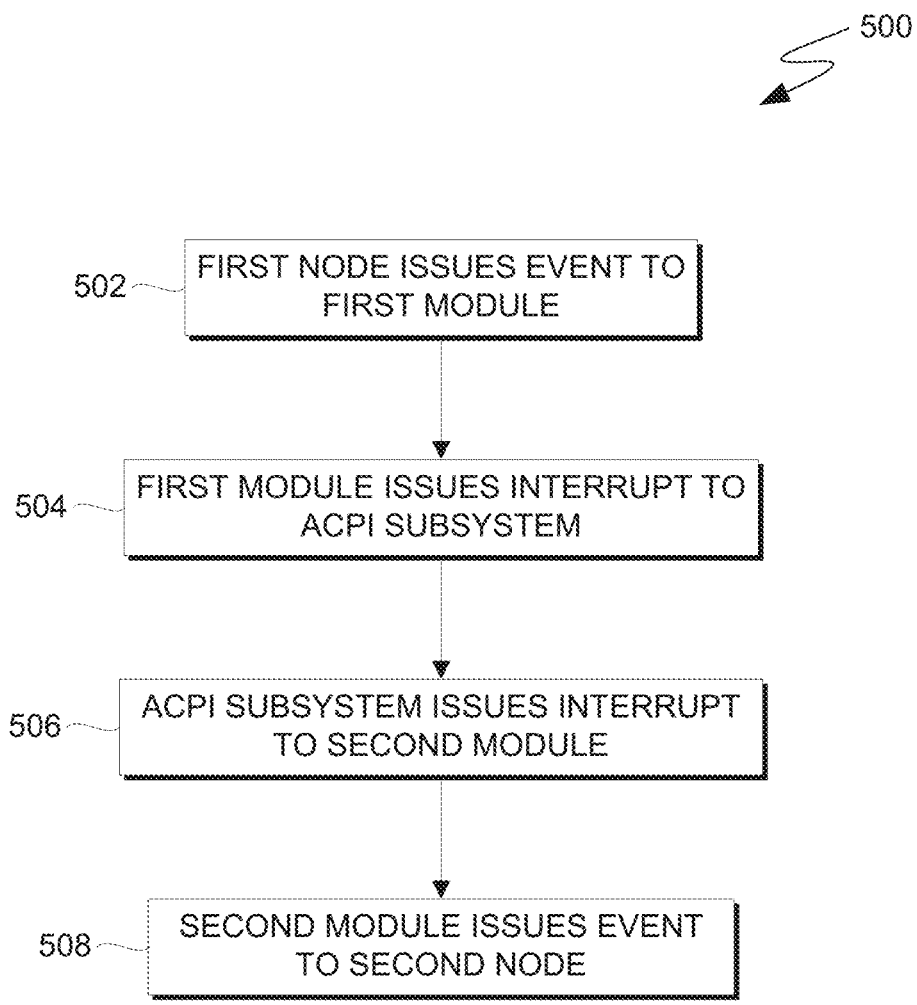
FIG. 5 is a flowchart depicting operations for storage and application intercommunication using ACPI, on the computing system of FIG. 1, in accordance with embodiments of the present invention.
Figure 6A:
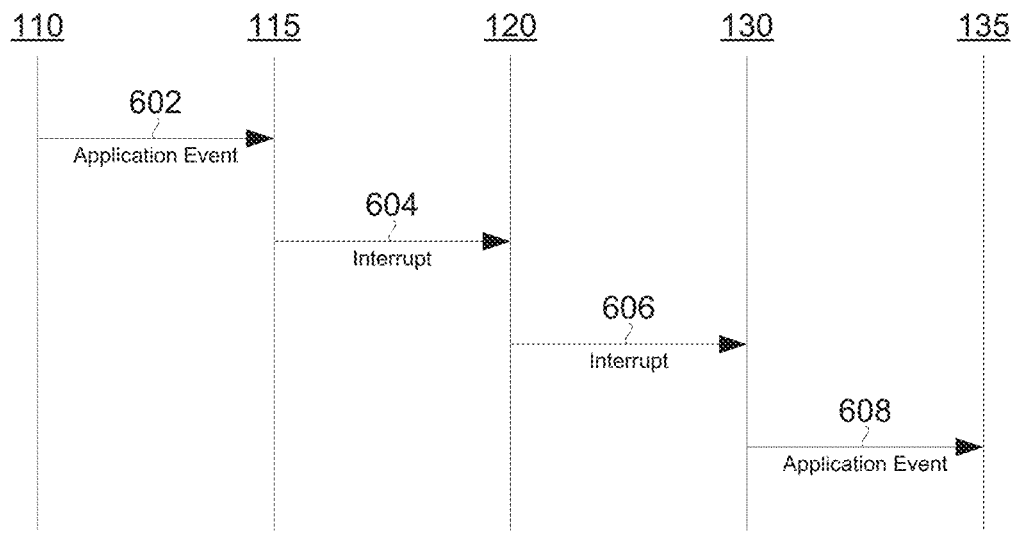
FIG. 6A is a ladder diagram of an example of application event communication, in accordance with embodiments of the present invention.
Figure 6B:
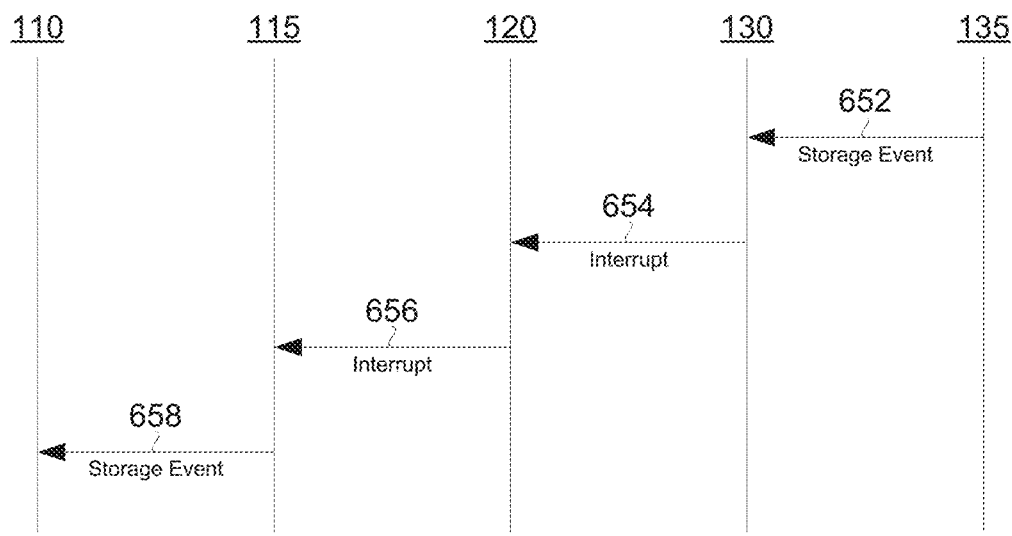
FIG. 6B is a ladder diagram of an example of storage event communication, in accordance with embodiments of the present invention.

FIG. 5 is a flowchart depicting operations 500 for storage and application intercommunication using ACPI, on computing system 100 of FIG. 1, in accordance with embodiments of the present invention. FIG. 6A is a ladder diagram of an example of application event communication, in accordance with embodiments of the present invention. FIG. 6B is a ladder diagram of an example of storage event communication, in accordance with embodiments of the present invention.

For convenience of description, FIG. 5 and the accompanying discussion refer to a first node, a first module, a second node, and a second module. It should be understood that the first node represents one of application 110 and storage subsystem 135, the other of which is represented by the second node. Each of the first module and second module represent a kernel-mode module (e.g., ACPI agent 115, storage system daemon 130) via which each of the first node and the second node, respectively, communicate with ACPI subsystem 120.

In operation 502, the first node issues an event to the first module. The event is based on an operational parameter of the first node. The first node determines the operational parameter based on a current or anticipated status of the first node.

Referring to the example depicted in FIG. 6A, application 110 issues application event 602 to ACPI agent 115. In one embodiment, application 110 communicates with ACPI agent 115 via a message passing protocol or other inter-application communication technique by which application 110 issues application event 602 to ACPI agent 115. Application 110 determines application event 602 based on a shared namespace and a determined operational parameter of application 110. In the example depicted in FIG. 6A, application event 602 indicates that application 110 anticipates performing multiple non-consecutive write operations to storage subsystem 135.

Referring to the example depicted in FIG. 6B, storage subsystem 135 issues storage event 652 to storage system daemon 130. In one embodiment, storage subsystem 135 communicates with storage system daemon 130 via a storage interface (e.g., SCSI) by which storage subsystem 135 issues storage event 652 to storage system daemon 130. Storage subsystem 135 determines storage event 652 based on a shared namespace and a determined operational parameter of storage subsystem 135. In the example depicted in FIG. 6B, storage event 652 indicates that a read buffer of storage subsystem 135 is full.

In operation 504, the first module issues an interrupt to ACPI subsystem 120. In one embodiment, the interrupt is based on the event issued by the first node to the first module. For example, the interrupt may include, identify, or describe the event. In one embodiment, the event is an ACPI event communicated by the first module to ACPI subsystem 120 via an SCI. In another embodiment, the first module utilizes an in-memory syncing mechanism having extensible tables (e.g., other than ACPI). In another embodiments, the interrupt is an SMI.

Referring to the example depicted in FIG. 6A, ACPI agent 115 issues interrupt 604 to ACPI subsystem 120. Interrupt 604 communicates application event 602 from application 110 to ACPI subsystem 120.

Referring to the example depicted in FIG. 6B, storage system daemon 130 issues interrupt 654 to ACPI subsystem 120. Interrupt 654 communicates storage event 652 from storage subsystem 135 to ACPI subsystem 120.

In operation 506, ACPI subsystem 120 issues an interrupt to the second module. In one embodiment, ACPI subsystem 120 forwards the interrupt received from the first module to the second module. In another embodiment, ACPI subsystem 120 issues a new interrupt to the second module than the interrupt received from the first module. In this case, the new interrupt identifies the event generated by the first node in operation 502. In various examples, the interrupted that ACPI subsystem 120 issues to the second module is an SMI or an SCI. For example, ACPI subsystem 120 may receive an SCI from the first module and issue an SMI to the second module. In this example, the received and issued interrupts communicate the event generated by the first node.

Referring to the example depicted in FIG. 6A, ACPI subsystem 120 issues interrupt 606 to storage system daemon 130. Interrupt 606 communicates application event 602, which was generated by application 110, from ACPI subsystem 120 to storage system daemon 130.

Referring to the example depicted in FIG. 6B, ACPI subsystem 120 issues interrupt 656 to ACPI agent 115. Interrupt 656 communicates storage event 652, which was generated by storage subsystem 135, from ACPI subsystem 120 to ACPI agent 115.

In operation 508, the second module issues an event to the second node. The second module identifies the event based on the interrupt received by the second module from ACPI subsystem 120 and further based on the shared namespace.

Referring to the example depicted in FIG. 6A, storage system daemon 130 issues application event 608 to storage subsystem 135. Application event 608 corresponds to the operational parameter based on which application 110 determined application event 602. In one embodiment, application event 608 and application event 602 correspond to the same object of the shared namespace. Thus, application event 608 communicates an operational parameter of application 110 to storage subsystem 135. In the depicted example, application event 608 communicates that application 110 anticipates performing multiple non-consecutive write operations to storage subsystem 135. In this case, in response to receiving application event 608, storage subsystem 135 may perform one or more operations (e.g., to account for the incoming write operations).

Referring to the example depicted in FIG. 6B, ACPI agent 115 issues storage event 658 to application 110. Storage event 658 corresponds to the operational parameter on which storage subsystem 135 determined storage event 652. In one embodiment, storage event 658 and storage event 652 correspond to the same object of the shared namespace. Thus, storage event 658 communicates an operational parameter of storage subsystem 135 to application 110. In the depicted example, storage event 658 communicates that a read buffer of storage subsystem 135 is full. In this case, in response to receiving storage event 658, application 110 may perform one or more operations (e.g., to account for slower read performance).

Figure 7:
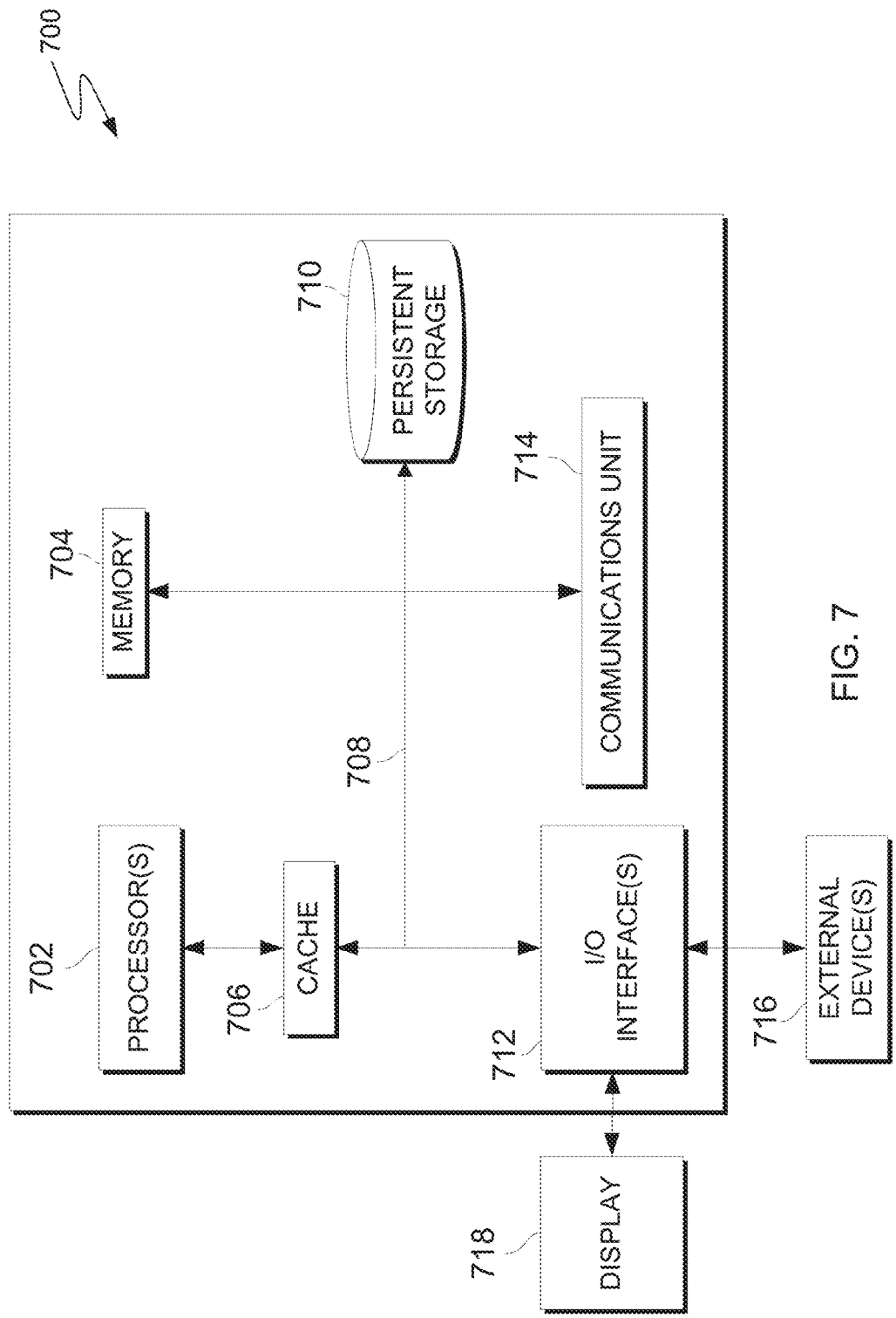
FIG. 7 is a block diagram of components of a computing device executing operations for storage and application intercommunication using ACPI, in accordance with embodiments of the present invention.

FIG. 7 is a block diagram of components of a computing device, generally designated 700, in accordance with embodiments of the present invention. In one embodiment, computing system 700 is representative of computing system 100 of FIG. 1, in which case computing system 700 includes at least ACPI agent 115 and storage system daemon 130.

It should be appreciated that FIG. 7 provides only an illustration of one implementation and does not imply any limitations with regard to the environments in which different embodiments may be implemented. Many modifications to the depicted environment may be made.

Computing system 700 includes processor(s) 702, cache 706, memory 704, persistent storage 710, input/output (I/O) interface(s) 712, communications unit 714, and communications fabric 708. Communications fabric 708 provides communications between cache 706, memory 704, persistent storage 710, communications unit 714, and input/output (I/O) interface(s) 712. Communications fabric 708 can be implemented with any architecture designed for passing data and/or control information between processors (such as microprocessors, communications and network processors, etc.), system memory, peripheral devices, and any other hardware components within a system. For example, communications fabric 708 can be implemented with one or more buses or a crossbar switch.

Memory 704 and persistent storage 710 are computer readable storage media. In this embodiment, memory 704 includes random access memory (RAM). In general, memory 704 can include any suitable volatile or non-volatile computer readable storage media. Cache 706 is a fast memory that enhances the performance of processor(s) 702 by holding recently accessed data, and data near recently accessed data, from memory 704.

Program instructions and data used to practice embodiments of the present invention may be stored in persistent storage 710 and in memory 704 for execution by one or more of the respective processor(s) 702 via cache 706. In an embodiment, persistent storage 710 includes a magnetic hard disk drive. Alternatively, or in addition to a magnetic hard disk drive, persistent storage 710 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 710 may also be removable. For example, a removable hard drive may be used for persistent storage 710. Other examples include optical and magnetic disks, thumb drives, and smart cards that are inserted into a drive for transfer onto another computer readable storage medium that is also part of persistent storage 710.

Communications unit 714, in these examples, provides for communications with other data processing systems or devices. In these examples, communications unit 714 includes one or more network interface cards. Communications unit 714 may provide communications through the use of either or both physical and wireless communications links. Program instructions and data used to practice embodiments of the present invention may be downloaded to persistent storage 710 through communications unit 714.

I/O interface(s) 712 allows for input and output of data with other devices that may be connected to each computer system. For example, I/O interface(s) 712 may provide a connection to external device(s) 716 such as a keyboard, keypad, a touch screen, and/or some other suitable input device. External device(s) 716 can also include portable computer readable storage media such as, for example, thumb drives, portable optical or magnetic disks, and memory cards. Software and data used to practice embodiments of the present invention can be stored on such portable computer readable storage media and can be loaded onto persistent storage 710 via I/O interface(s) 712. I/O interface(s) 712 also connect to display 718.

Display 718 provides a mechanism to display or present data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for event-driven intercommunication, the method comprising:
   determining, by a first kernel-mode module, a first event corresponding to an operational parameter of a first node based, at least in part, on a shared namespace accessible by the first kernel-mode module and a second kernel-mode module, wherein the operational parameter of the first node is an anticipated status of the first node, based on one or more non-consecutive operations scheduled to be executed by the first node, wherein the first node is a storage subsystem of a computing device in communication with the second node, the second node comprising a user-level application stored externally and accessed through a communication network by the computing device;
   issuing an interrupt based on the first event from the first kernel-mode module to the second kernel-mode module via an interface; and
   issuing, by the second kernel-mode module, a second event to a second node, wherein the second event corresponds to an object of the shared namespace.

2. The method of claim 1, wherein the first node is a user-level application of a computing device, the second node is a storage subsystem of the computing device, the storage subsystem comprises a high performance storage device, and the one or more non-consecutive operations scheduled to be performed comprises a large plurality of non-consecutive write operations.

3. The method of claim 2, wherein the first node communicates the first event to the first kernel-mode module via a message passing protocol, and wherein the second kernel-mode module communicates the second event to the second node via a storage interface.

4. The method of claim 2, wherein the high performance storage device is a flash storage device.

5. The method of claim 1, wherein the user-level application comprises a correlation table that correlates storage events with actions to be performed by the user-level application.

6. The method of claim 1, wherein the first node is a storage subsystem of a computing device, the second node is a user-level application of the computing device, and the one or more non-consecutive operations scheduled to be performed comprises a large plurality of scheduled non-consecutive read operations.

7. The method of claim 1, wherein determining the first event is further based on the object of the shared namespace corresponding to the operational parameter of the first node.

8. The method of claim 1, wherein the interface is an event-driven synching mechanism having in-memory extensible tables, and wherein the in-memory extensible tables are not advanced configuration and power interface tables.

9. The method of claim 1, wherein the interface is one of: advanced configuration and power interface and system management basic input output system.

10. A computer program product for event-driven intercommunication using ACPI, the computer program product comprising:
    a computer readable storage medium and program instructions stored on the computer readable storage medium, the program instructions comprising:
    program instructions to determine, by a first kernel-mode module, a first event corresponding to an operational parameter of a first node based, at least in part, on a shared namespace accessible by the first kernel-mode module and a second kernel-mode module, wherein the operational parameter of the first node is an anticipated status of the first node, based on one or more non-consecutive operations scheduled to be executed by the first node,
    wherein the first node is a storage subsystem of a computing device in communication with the second node, the second node comprising a user-level application stored externally and accessed through a communication network by the computing device;

program instructions to issue an interrupt based on the first event from the first kernel-mode module to the second kernel-mode module via an interface; and program instructions to issue, by the second kernel-mode module, a second event to a second node, wherein the second event corresponds to an object of the shared namespace.

11. The computer program product of claim 10, wherein: wherein the first node is a user-level application of a computing device, the second node is a storage subsystem of the computing device, the storage subsystem comprises a high performance storage device, and the one or more non-consecutive operations scheduled to be performed comprises a large plurality of non-consecutive write operations.

12. The computer program product of claim 10, wherein the first node is a storage subsystem of a computing device, the second node is a user-level application of the computing device, and the one or more non-consecutive operations scheduled to be performed comprises a large plurality of scheduled non-consecutive read operations.

13. The computer program product of claim 10, wherein determining the first event is further based on the object of the shared namespace corresponding to the operational parameter of the first node.

14. The computer program product of claim 10, wherein the interface is an event-driven synching mechanism having in-memory extensible tables, and wherein the in-memory extensible tables are not advanced configuration and power interface tables.

15. A computer system for event-driven intercommunication using ACPI, the computer system comprising:

one or more computer processors;

one or more computer readable storage media;

program instructions stored on the one or more computer readable storage media for execution by at least one of the one or more computer processors, the program instructions comprising:

program instructions to determine, by a first kernel-mode module, a first event corresponding to an operational parameter of a first node based, at least in part, on a shared namespace accessible by the first kernel-mode module and a second kernel-mode module, wherein the operational parameter of the first node is an anticipated status of the first node, based on one or more non-consecutive operations scheduled to be executed by the first node, wherein the first node is a storage subsystem of a computing device in communication with the second node, the second node comprising a user-level application stored externally and accessed through a communication network by the computing device;

program instructions to issue an interrupt based on the first event from the first kernel-mode module to the second kernel-mode module via an interface; and program instructions to issue, by the second kernel-mode module, a second event to a second node, wherein the second event corresponds to an object of the shared namespace.

16. The computer system of claim 15, wherein the first node is a user-level application of a computing device, the second node is a storage subsystem of the computing device, the storage subsystem comprises a high performance storage device, and the one or more non-consecutive operations scheduled to be performed comprises a large plurality of non-consecutive write operations.

17. The method of claim 1, wherein the first node is a storage subsystem of a computing device, the second node is a user-level application of the computing. device, and the one or more non-consecutive operations scheduled to be performed comprises a large plurality of scheduled non-consecutive read operations.

\* \* \* \* \*